United States Patent
Reymann (10) Patent No.: US 8,594,166 B2
(45) Date of Patent: Nov. 26, 2013

(54) METHOD AND SYSTEM FOR THE SERIAL TRANSMISSION OF DATA

(75) Inventor: Dirk Reymann, Hambühren (DE)

(73) Assignee: Sennheiser electronic GmbH & Co., KG, Wedemark (DE)

( * ) Notice: Subject to any disclaimer, the term of this patent is extended or adjusted under 35 U.S.C. 154(b) by 146 days.

(21) Appl. No.: 13/001,374

(22) PCT Filed: Jul. 2, 2009

(86) PCT No.: PCT/EP2009/058332
§ 371 (c)(1),
(2), (4) Date: Mar. 24, 2011

(87) PCT Pub. No.: WO2010/000805
PCT Pub. Date: Jan. 7, 2010

(65) Prior Publication Data
US 2011/0164667 A1    Jul. 7, 2011

(30) Foreign Application Priority Data
Jul. 4, 2008 (DE) .................. 10 2008 031 357

(51) Int. Cl.
*H04B 17/00* (2006.01)
*H04Q 1/20* (2006.01)

(52) U.S. Cl.
USPC ........... 375/224; 375/226; 375/227; 375/228

(58) Field of Classification Search
USPC ........................................ 375/224, 226, 227
See application file for complete search history.

(56) References Cited

U.S. PATENT DOCUMENTS

| 5,210,846 A | * | 5/1993 | Lee | ............................ 710/115 |
| 5,506,965 A | * | 4/1996 | Naoe | ............................ 709/209 |

(Continued)

FOREIGN PATENT DOCUMENTS

| EP | 0489944 A1 | 6/1992 |
| WO | WO 03/096036 A1 | 11/2003 |

OTHER PUBLICATIONS

International Search Report for PCT Application No. PCT/EP2009/058332 mailed on Nov. 2, 2009; 8 pages.

(Continued)

*Primary Examiner* — Qutbuddin Ghulamali
(74) *Attorney, Agent, or Firm* — Kilpatrick Townsend & Stockton LLP (57) ABSTRACT

There is provided a system for the bidirectional synchronous transmission of data between a device (1) to be tested and a testing device (2) with a device (1) to be tested and a testing device (2) which can be connected together by way of an electric transmission line (3) and by way of an electric ground line (4). The two devices (1, 2) are suitable for sending and receiving data synchronously with a predetermined clock frequency and phase as sequences of first and second voltages which respectively represent a first and second value of a bit on the electric transmission line (3). To receive data a receiving device (1, 2) samples a voltage on the electric transmission line (3) at predetermined sampling phases of the clock to identify whether the first or the second voltage is present. To send data a sending device (1, 2) produces sequences of first and second voltages in such a way that the first or the second voltage is present on the electric transmission line (3) at the predetermined sampling phases of the receiving device (1, 2). The clock frequency and phase is predetermined by the device (1) to be tested and the testing device (2) is synchronized to said clock frequency and phase, wherein in an initialization phase the device (1) to be tested transmits a sequence of alternate first and second voltages on the electric transmission line (3) and the testing device (2) derives the clock frequency and phase from said sequence.

5 Claims, 6 Drawing Sheets

(56) References Cited

U.S. PATENT DOCUMENTS

| | | | |
|---|---|---|---|
| 6,532,506 | B1 | 3/2003 | Dunstan et al. |
| 7,650,450 | B2 * | 1/2010 | Soriano et al. ............... 710/110 |
| 7,890,788 | B2 * | 2/2011 | Yin et al. ..................... 713/500 |
| 2004/0233917 | A1 | 11/2004 | Rocas |
| 2006/0039408 | A1 | 2/2006 | Wortel |
| 2008/0077336 | A1 * | 3/2008 | Fernandes ..................... 702/57 |

OTHER PUBLICATIONS

Written Opinion or PCT Application No. PCT/EP2009/058332 mailed on Nov. 2, 2009; 6 pages.

Koopman et al. "Cyclic Redundancy Code (CRC) Polynominal Selection for Embedded Networks", Proceedings of the 2004 International Conference on Dependable Systems and Networks, 2004 IEEE, Florence, Italy; 10 pages.

* cited by examiner

METHOD AND SYSTEM FOR THE SERIAL TRANSMISSION OF DATA

CROSS-REFERENCE TO RELATED APPLICATIONS

This application is a U.S. National Stage of PCT Application No. PCT/EP2009/058332 filed Jul. 2, 2009, which claims the benefit of German Application No. 102008031357.2 filed Jul. 4, 2008, the contents of both applications hereby incorporated by reference in their entirety for all purposes.

BACKGROUND

The present invention concerns a method for the bidirectional, serial transmission of data between two devices by way of a single electric transmission line. The invention further concerns a corresponding transmission system and corresponding devices.

During the development, production or maintenance of electronic devices it may be necessary to be able to access the firmware and/or internal states of the device to be tested, in reading and/or writing mode. One example would be interrogating a battery module in accordance with charge state, serial number, an identification code or similar items of information. A further example would be the configuration of internal parameters in an A/D converter component. In that respect for cost reasons it is not desirable in many cases to provide a dedicated interface hardware for communication with a testing device, in the device to be tested. What would be desirable would be the possibility of generic data exchange with total elimination of specific interface hardware and with only low demands in terms of computing time and timing of the device to be tested.

A preferred option is to serially communicate with the device to be tested, by way of a single controller pin which can otherwise also be used for other uses, for example for implementing a switching key. The memory and computing capacity necessary for implementing such a communication and for synchronization of the data exchange, in the device to be tested, should preferably be as small as possible.

Methods and systems for the serial transmission of data between two or more devices are known. The one-wire bus developed by Dallas Semiconductor (referred to as the "1-wire") describes a bidirectional serial interface for data transmission by way of a single electric line.

The one-wire bus can be used in networks with a master device and one or more slave devices, in which case it is possible to construct different network topologies. As the one-wire bus does not use a separate electric line for the clock signal, clock and data must be transmitted by way of the same electric line. That is effected by the master device initiating a cycle for writing or reading a single bit so that it firstly pulls the voltage on the electric line (the so-called HI-voltage) downwardly, that is to say to the so-called LO-voltage.

In the writing mode the master device, for writing a binary "1", retains the LO-voltage for a predetermined time $t_{WRITE-1}$ before it releases the electric line again to the HI-voltage. To write a binary "0" the master device already releases the electric line to the HI-voltage again after a predetermined time $t_{WRITE-0}$ which is shorter than $t_{WRITE-1}$. A reading slave device registers the falling edge of the voltage pulse generated by the master device and after a predetermined delay time $t_{SAMPLE-S}$ which is suitably between $t_{WRITE-0}$ and $t_{WRITE-1}$ reads the voltage on the electric line. If the voltage read by the slave device corresponds to the HI-voltage a binary "0" was recognized, while if the read voltage corresponds to the LO-voltage a binary "1" was recognized.

In the reading mode the master device releases the electric line to the HI-voltage again after a predetermined time $t_{READ}$. A writing slave device registers the falling edge of the voltage pulse generated by the master device and to write a binary "0" after the predetermined time $t_{READ}$ pulls the voltage on the electric line to the LO-voltage. To write a binary "1" a writing slave device does nothing at all so that the HI-voltage is again on the electric line. After a predetermined delay time $t_{SAMPLE-M}$ which is greater than $t_{READ}$ the master reads the voltage on the electric line. If the voltage read by the master device corresponds to the HI-voltage a binary "0" was recognized while if the read voltage corresponds to the LO-voltage a binary "1" was recognized. The one-wire bus has the disadvantage that the slave devices require dedicated hardware (delay member and so forth) and must be synchronized to the timing predetermined by the master device. In the slave devices that leads to a comparatively high resource requirement for synchronization.

A further known serial bus system is the I²C system developed by Philips Semiconductors, which is used to connect slow peripheral devices to the main circuit board of a computer, to an embedded system, to a cellular telephone or to a similar device. The I²C system has the disadvantage that it needs two separate electric lines for transmission of clock and data.

A similar system is the SPI-bus (from "Serial Peripheral Interface") developed by Motorola which permits synchronous serial transmission of data between a master device and one or more slave devices. The SPI-bus however has the disadvantage that it uses a total of four separate electric lines for the transmission of clock and data.

Thus the object of the present invention is to provide a method for bidirectional serial transmission of data between two devices, in particular between a device to be tested and a testing device, which uses only a single electric transmission line for the transmission of clock and data and which involves a lower need for resources for synchronization than the previously known transmission systems.

SUMMARY

That object is attained by a transmission system and a transmission method as set forth in the claims.

Thus there is provided a system for the bidirectional synchronous transmission of data between a device to be tested and a testing device with a device to be tested and a testing device which can be connected together by way of an electric transmission line and by way of an electric ground line. The two devices are suitable for sending and receiving data synchronously with a predetermined clock frequency and phase as sequences of first and second voltages which respectively represent a first and second value of a bit on the electric transmission line. To receive data a receiving device samples a voltage on the electric transmission line at predetermined sampling phases of the clock to identify whether the first or the second voltage is present. To send data a sending device produces sequences of first and second voltages in such a way that the first or the second voltage is present on the electric transmission line at the predetermined sampling phases of the receiving device. The clock frequency and phase is predetermined by the device to be tested and the testing device is synchronized to said clock frequency and phase, wherein in an initialization phase the device to be tested transmits a sequence of alternate first and second voltages on the electric transmission line and the testing device derives the clock frequency and phase from said sequence.

The invention concerns the notion of providing a system for bidirectional synchronous transmission of data between a device to be tested and a testing device, in which the responsibility for defining and making available the clock is solely and simply with the device to be tested. Because the device to be tested defines the clock and makes it available for data transmission, the requirement in respect of resources necessary for communication in the device to be tested is comparatively slight. It is only necessary to ensure that the routines necessary for communication in the device to be tested are called up at fairly regular intervals. In that way for example a cyclic procedure already present in the device to be tested can also be used for clock generation.

In an aspect of the invention the predetermined sampling phases of the device to be tested and the testing device are in mutually phase-displaced relationship. That has the advantage that the sending phases and the corresponding receiving phases of the two devices are displaced relative to each other, thereby improving correct data identification.

In a further aspect of the invention the sampling phases of the device to be tested are substantially central between the sampling phases of the testing device. That has the advantage that the sending phases and the corresponding receiving phases of the two devices are displaced relative to each other at substantially equal spacings, whereby correct data identification is further improved.

In still a further aspect of the invention the sending device for sending data produces sequences of first and second voltages in such a way that in a phase range around the predetermined sampling phases of the receiving device the first or the second voltage is present on the electric transmission line. That has the advantage that correct data identification is permitted to the receiving device even in the case of a phase jitter as the first or the second voltage is not only present in exact relationship with the predetermined sampling phase on the electric transmission line.

In a further aspect of the invention the phase range is at least −20° through +20°, preferably at least −30° through +30°. If the first or second voltage is present in a larger phase range around the predetermined sampling phases of the receiving device that has the advantage that correct data identification is made possible even in the event of correspondingly greater phase jitter.

In still a further aspect of the invention in a data transmission phase data are transmitted in data packets which begin with a shorter sequence of alternate first and second voltages, and wherein the testing device subsequently corrects the derived clock frequency and phase with said sequence. Because the testing device continuously corrects its protocol clock, that is to say the clock frequency and phase which it derived in the initialization phase from the sequence of alternate first and second voltages sent by the device to be tested, it is possible to ensure that the testing device still runs synchronously in relation to the device to be tested even after a prolonged time.

In a further aspect of the invention there is provided a method for the bidirectional synchronous transmission of data between a device to be tested and a testing device which can be connected together by way of an electric transmission line and by way of an electric ground line. The two devices are suitable for sending and receiving data synchronously with a predetermined clock frequency and phase as sequences of first and second voltages which respectively represent a first and second value of a bit on the electric transmission line. To receive data a receiving device samples a voltage on the electric transmission line at predetermined sampling phases of the clock to identify whether the first or the second voltage is present. To send data a sending device produces sequences of first and second voltages in such a way that the first or the second voltage is present on the electric transmission line at the predetermined sampling phases of the receiving device. The clock frequency and phase is predetermined by the device to be tested and the testing device is synchronized to said clock frequency and phase, wherein in an initialization phase the device to be tested transmits a sequence of alternate first and second voltages on the electric transmission line and the testing device derives the clock frequency and phase from said sequence.

In a further aspect of the invention a device to be tested is provided for use in a system for bidirectional synchronous transmission of data between the device to be tested and a testing device.

In still a further aspect of the invention a testing device is provided for use in a system for bidirectional synchronous transmission of data between the device to be tested and a testing device as set forth in claim 1.

Further aspects of the invention are subject-matter of the appendant claims.

BRIEF DESCRIPTION OF THE DRAWINGS

The advantages and embodiments by way of example of the invention are described in greater detail hereinafter with reference to the drawings.

DETAILED DESCRIPTION

Figure 1:
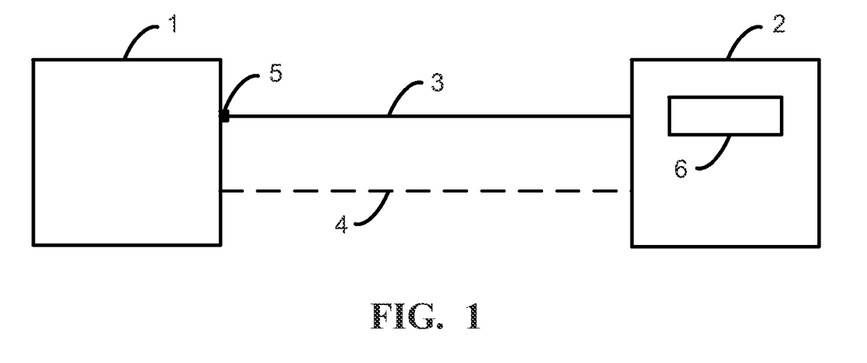
FIG. 1 shows a diagrammatic view of a system for serial data transmission in a first embodiment.

FIG. 1 shows a diagrammatic view of a system for serial data transmission in accordance with a first embodiment. The system has a first electronic device 1, wherein a user would like to have access to its firmware and/or internal states, for example during development, production or maintenance. The first electronic device 1 is to be referred to hereinafter as the device 1 to be tested. Provided for communication with the device 1 to be tested is a second electronic device 2 referred to hereinafter as the testing device 2. The testing device 2 is usually a kind of testing or maintenance interface. The device 1 to be tested and the testing device 2 can be connected directly together by way of a single electric transmission line 3—in addition to a common ground line 4. It is preferable that the electric transmission line 3 can be connected to the device 1 to be tested by way of a single controller pin 5, wherein the controller pin 5 of the device 1 to be tested preferably remains available for other uses, for example for the implementation of a switching key, when the device 1 to be tested and the testing device 2 are not connected together.

Architecture

In the connected state the connection between the device 1 to be tested and the testing device 2 forms a pure point-to-point connection, that is to say besides between those two devices there is no further network operation and no data communication with further devices.

The communication between the device 1 to be tested and the testing device 2 is a serial bidirectional half-duplex transmission. Certain functions which are necessary for the transmission of data by way of the electric transmission line 3 are respectively associated with the device 1 to be tested or the testing device 2.

The device 1 to be tested can be envisaged as a kind of server. Normally but not necessarily the device 1 to be tested includes the items of information which are of interest to the user, and it performs suitable actions at the request of the user. According to the invention the device 1 to be tested defines the reference clock and makes the clock frequency and phase available for synchronous data transmission.

Because the device 1 to be tested defines the clock and makes it available for data transmission the demands in terms of the resources necessary for communication in the device 1 to be tested are comparatively slight. It is only necessary to ensure that the routines necessary for communication in the device 1 to be tested are called up at fairly regular intervals. In that way for example a cyclic procedure already present in the device 1 to be tested can also be used for clock generation.

In regard to synchronization the testing device 2 behaves rather like a client, that is to say it is synchronized to the clock frequency and phase which is predetermined by the device 1 to be tested. The testing device 2 sends requests to the device 1 to be tested and receives corresponding responses. Typically the testing device 2 also makes a user interface 6 available for the user. In that case the testing device 2 forms the interface for the user, for access to the device 1 to be tested by way of the electric transmission line 3.

It should be mentioned that the described asymmetry between the device 1 to be tested and the testing device 2 is essentially based on the consideration that the responsibility for defining and making available the clock is solely and simply with the device 1 to be tested. Each of the two devices, that is to say both the device 1 to be tested and also the testing device 2 can however send requests and provide responses to incoming requests.

OSI Layer 1: Bit Transmission Layer

The physical connection between the device 1 to be tested and the testing device 2 is a single electric transmission line 3—in addition to a common ground line 4. Binary values in the form of two voltages of different magnitudes can be transmitted by way of the electric transmission line 3. In that respect the higher of the two voltages (referred to hereinafter as the HI-voltage) represents a binary "0" and the lower of the two voltages (hereinafter referred to as the LO-voltage) represents a binary "1".

That transmission of binary values in the form of two voltages of different magnitudes is preferably implemented by using a transistor with an "open collector" both in the device 1 to be tested and also in the testing device 2. In that case the collectors of the transistors respectively form the outputs, by way of which the two devices, that is to say the device 1 to be tested and the testing device 2, are connected together. The emitters of the transistors are respectively connected to ground. Both transistors are "open" in their non-active state, that is to say the output (collector) is not connected to ground while they are "closed" in their active state, that is to say the output (collector) is connected to ground.

When both the transistor in the device 1 to be tested and also the transistor in the testing device 2 are non-active ("open"), the HI-voltage is present on the electric transmission line 3, produced by a bus voltage $V_{BUS}$ by means of a pull-up resistor $R_{UP}$ which is installed in the device 1 to be tested. Preferably the pull-up resistor $R_{UP}$ of the device 1 to be tested has a resistance value which is between a minimum resistance value of 25 kΩ and a maximum resistance value of 50 kΩ. The bus voltage $V_{BUS}$ should preferably be between a minimum voltage value of 2.0 V and a maximum voltage value of 5.0 V.

If one of the two devices, that is to say the device 1 to be tested or the testing device 2, wants to transmit data, it actively pulls the voltage on the electric transmission line 3 to the LO-voltage by "closing" the transistor, by connecting the output (collector) to ground.

The testing device 2 has a pull-down resistor $R_{DOWN}$ to produce a defined electric voltage, preferably the LO-voltage, when no device 1 to be tested is connected to the testing device 2. Preferably the pull-down resistor $R_{DOWN}$ has a minimum resistance value of 1 MΩ.

The length of the electric transmission line 3 and therewith its electrical capacitance is limited by the minimum rise time which permits stable identification of the voltage states. Preferably the maximum capacitance between the components of the transmission system is divided in such a way that the device 1 to be tested has a maximum capacitance value of 100 pF (pico-farad), the testing device 2 has a maximum capacitance value of 50 pF and the electric transmission line 3 has a maximum capacitance value of 100 pF. It is further preferred for the device 1 to be tested to be capable of raising its internal output capacitance in conjunction with a lower clock speed above the predetermined maximum capacitance value of preferably 100 pF.

The logical association and the identification tolerances are preferably such that the lower voltage, that is to say the LO-voltage, is identified when the voltage on the electric transmission line 3 is of a value of less than 1.0 V; the binary value "1" is associated with a voltage which meets that demand. The higher voltage, that is to say the HI-voltage, is preferably identified when the voltage on the electric transmission line 3 is of a value greater than $0.9*V_{BUS}$; the binary value "0" is associated with a voltage which meets that demand.

The clock is established by the device 1 to be tested and is made available thereby for the synchronous transmission of data. The device 1 to be tested can select any clock within a predetermined range which preferably goes from a minimum value of 1000 bits per second (bps) to a maximum value of 5000 bps. The permissible phase jitter is preferably between −30° and +30°. The testing device 2 is synchronized to the clock frequency and phase predetermined by the device 1 to be tested. The device 1 to be tested can only alter the clock when the testing device 2 is not synchronized, that is to say when still no connection has been made between the device 1 to be tested and the testing device 2 or when the connection between the device 1 and the testing device 2 was terminated by a RESET message and no new CLOCKSYNC message has still been sent (see hereinafter).

Figure 2:
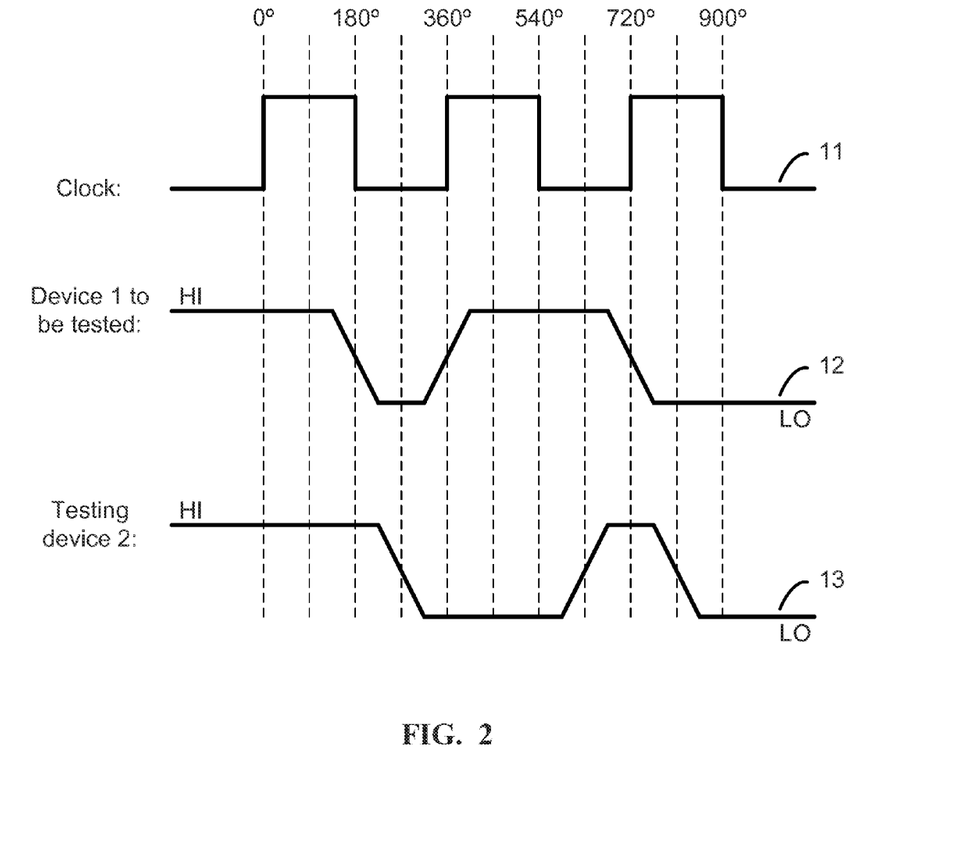
FIG. 2 shows a diagrammatic view of the timing of the data transmission in accordance with the first embodiment.

FIG. 2 is a diagrammatic view of the timing of the data transmission in accordance with the first embodiment. The clock 11 established by the device 1 to be tested forms the reference for data transmission both for the sending and also the receiving devices. In that respect two bits can be sent and received respectively within a phase of 360°.

In accordance with the invention the timing of the testing device 2 is phase-displaced with respect to the timing of the device 1 to be tested by preferably 90°, that is to say there is preferably a phase of 90° between the moment in time at which the sending device sets a bit by setting the voltage on the electric transmission line 3 (the HI-voltage corresponds to a binary "0" and the LO-voltage corresponds to a binary "1") and the moment in time at which the receiving device reads the bit by sampling the voltage on the electric transmission line 3.

In the first embodiment selected in FIG. 2 to illustrate the timing the device 1 to be tested sends a bit pattern "01001" to the testing device 2 by producing a voltage configuration 12 on the electric transmission line 3. The voltage configuration 12 has voltage transitions (from the HI- to the LO-voltage for setting a binary "1" to a binary "0" and vice-versa) at 180°, 360° and 720° phase. At 0° and 540° phase the device 1 to be tested keeps the voltage constant as here in each case two bits of equal value are successively sent. The testing device 2 samples the voltage on the electric transmission line 3 in each case at a phase of 90°, 270°, 450°, 630° and so forth to read the bits sent by the device 1 to be tested. To permit correct identification of the data by the testing device 2 it is necessary to ensure that, at the sampling times of the testing device 2, the desired HI- or LO-voltage is present on the electric transmission line 3, that is to say the voltage transitions produced by the device 1 to be tested must be concluded at the sampling times of the testing device 2. In order to permit correct data identification even with an admissible phase jitter of preferably −30° through +30°, the desired HI- or LO-voltage must be present on the electric transmission line 3 in a suitable phase range around the sampling times of the testing device 2. Voltage transitions should therefore only take place outside that range.

In the second example shown in FIG. 2 the testing device 2 sends a bit pattern "001101" to the device 1 to be tested by producing a voltage configuration 13 on the electric transmission line 3. The voltage configuration 13 has voltage transitions at 270°, 630° and 810° phase. At 90° and 450° phase the testing device 2 keeps the voltage constant as here in each case two bits of equal value are sent in succession. The device 1 to be tested samples the voltage on the electric transmission line 3 in each case at a phase of 0°, 180°, 360°, 540° and so forth to read the bits sent by the testing device 2. To permit correct identification of the data by the device 1 to be tested it is necessary to ensure that, at the sampling times of the device 1 to be tested, the desired HI- or LO-voltage is present on the electric transmission line 3, that is to say the voltage transitions produced by the testing device 2 must be concluded at the sampling times of the device 1 to be tested. To permit correct data identification even with an admissible phase jitter of preferably between −30° and +30°, the desired HI- or LO-voltage must be present on the electric transmission line 3 in a suitable phase range around the sampling times of the device 1 to be tested. Voltage transitions should therefore take place only outside that range.

Table 1 shows once again in summary form the timing for data transmission from the device 1 to be tested to the testing device 2.

TABLE 1

Timing for data transmission from the device 1 to be tested to the testing device 2

| Phase | Device 1 to be tested | Testing device 2 |
|---|---|---|
| 0° | set bit | |
| 90° | | sampling |
| 180° | set bit | |
| 270° | | sampling |

Table 2 shows once again in summary form the timing for data transmission from the testing device 2 to the device 1 to be tested.

TABLE 2

Timing for data transmission from the testing device 2 to the device 1 to be tested

| Phase | Device 1 to be tested | Testing device 2 |
|---|---|---|
| 0° | sampling | |
| 90° | | set bit |
| 180° | sampling | |
| 270° | | set bit |

As the device 1 to be tested according to the invention defines both the clock frequency and also the phase there is no need for the device 1 to be tested to be synchronized to the transmission of the testing device 2. It is the responsibility of the testing device 2 to make the correct signal available at the correct time. In regard to synchronization that leads to a considerable reduction in complication and expenditure on the part of the device 1 to be tested.

Resetting a Connection (RESET Message)

To reset a connection, for example if the interface is no longer needed or if synchronization has been lost, each of the two devices, that is to say both the device 1 to be tested and also the testing device 2, can send a RESET message. That provides for erasing all clock information in the testing device 2.

If the controller pin 5 of the device 1 to be tested is also used for other uses, for example to implement a switching key, the device 1 to be tested can reset the controller pin 5 to its original function or however can react directly by sending a CLOCKSYNC message.

A RESET message is a continuous LO-voltage on the electric transmission line 3, which is longer than the longest possible packet. When the testing device 2 identifies the clock of the device 1 to be tested a LO-voltage which is 200 bits long is typically sufficient as a RESET message. If the device 1 to be tested operates for example with a clock of 2500 bps and if that clock is known to the testing device 2, it is typically sufficient to transmit an LO-voltage which is 80 ms long as the RESET message.

If the testing device 2 does not know the clock of the device 1 to be tested the slowest possible clock must be assumed to apply. With a minimum value of the clock of preferably 1000 bps the length $t_{RESET}$ of the RESET message should be greater than or equal to a minimum length of 200 ms.

It should be ensured that the device 1 to be tested is actually in a position to identify a RESET message. That is usually the case if the RESET message is sent in place of other data packets according to the invention. If synchronization had been previously lost and it was not known to the testing device 2 whether the device 1 to be tested is ready to receive incoming data packets, the RESET message should be prolonged to double its original length $t_{RESET}$. In that way the device 1 to be tested can identify the RESET message, even if no collision recognition is implemented.

Request for Synchronization (DOORBELL Message)

To cause the device 1 to be tested to makes its clock available for synchronization the testing device 2 sends a so-called DOORBELL message. That may also be necessary to deactivate the original function of the controller pin 5, by way of which the device 1 to be tested is connected to the testing device 2 by way of the electric transmission line 3, if the controller pin 5 is also used in the device 1 to be tested for other uses, for example for implementing a switching key.

It should be noted that the device 1 to be tested can ignore a DOORBELL message and of its own accord can send a CLOCKSYNC message directly after a RESET message.

Figure 3:
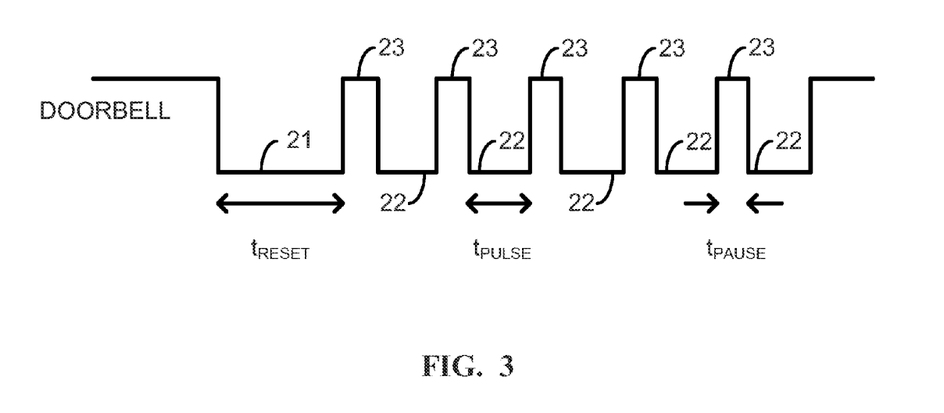
FIG. 3 shows a diagrammatic view of a DOORBELL message in accordance with the first embodiment.

FIG. 3 shows a diagrammatic view of a DOORBELL message in accordance with the first embodiment. The DOORBELL message is composed of a RESET message 21, that is to say a continuous LO-voltage of a length $t_{RESET}$ (see above), followed by five successive LO-pulses 22. The five successive LO-pulses 22 are each of a length $t_{PULSE}$ which is preferably between a minimum length of 9 ms and a maximum length of 11 ms. The RESET message 21 and the five successive LO-pulses 22 are respectively separated by HI-pulses 23, the length $t_{PAUSE}$ of which is preferably 2 ms.

Synchronization (CLOCKSYNC Message)

To make the clock frequency and phase available to the testing device 2 the device 1 to be tested transmits a so-called CLOCKSYNC message (initialization phase). That is usually effected after the device 1 to be tested has received a DOORBELL message sent by the testing device 2 or (optionally) directly after a RESET message 21.

The CLOCKSYNC message is a sequence of alternate LO- and HI-voltages of the length of a data packet (see OSI layer 2 for the definition of a data packet).

The testing device 2 analyzes the bit pattern of the CLOCKSYNC message and suitably sets its own protocol clock. To compensate for possible drift of the clock frequency and/or phase the testing device 2 should preferably also evaluate the signal edges of those data that it receives during the later regular data transmission (data transmission phase) from the device 1 to be tested in order in that way to continuously re-correct its protocol clock. It is possible in that way to ensure that the testing device 2 still runs synchronously with the device 1 to be tested even after a prolonged time.

As the phase jitter of the device 1 to be tested may preferably be up to ±30° the testing device 2 should implement correction of its protocol clock (clock frequency and/or phase), preferably using a suitable low pass filtering means.

To simplify the synchronization process for the testing device 2 each data packet begins with a 16 bit long SYNC data word of alternate LO- and HI-voltages, that is to say with a bit pattern "1010 1010 1010 1010"=0x5555 (or "1010 1010 1010 1011"=0xD555 (see below)).

OSI Layer 2: Security Layer

Format of the Data Packets

The transmission method according to the invention makes two different protocol variants available in the current version on the OSI layers 2 through 6.

In the simplified transmission protocol items of information are transmitted in data packets of fixed length each of 64 bits. Its purpose is to permit communication between the device 1 to be tested and a testing device 2 in a situation in which the memory and computing capacity necessary to implement such a communication and to synchronize the data exchange in the device 1 to be tested is extremely critical. The simplified transmission protocol admittedly affords only a reduced functionality, but in return the demands in terms of memory and computing capacity in the device 1 to be tested are very slight. In a reference implementation by way of example the memory requirement is approximately 300 bytes read-only memory (ROM) and approximately 20 bytes random access memory (RAM).

The expanded transmission protocol uses data packets of 144 bits length. In comparison with the simplified transmission protocol the expanded transmission protocol affords greater functionality, greater robustness and a somewhat faster data transmission. In return however the demands in terms of memory and computing capacity in the device 1 to be tested are also higher. In a reference implementation by way of example the memory requirement is in the region of between 60 and 1500 bytes read only memory (ROM) and in the region of between about 20 and 250 bytes random access memory (RAM).

It should be mentioned that a device 1 to be tested according to the invention does not necessarily have to support both protocol variants. Thus it may be for example that a device 1 to be tested implements only the simplified transmission protocol by virtue of lesser memory and computing capacity. A more powerful device 1 to be tested could implement both protocol variants or also only the expanded transmission protocol.

The two protocol variants according to the invention are described in detail hereinafter. Insofar as the description does not explicitly mention the protocol variant to which it applies, the description applies both to the simplified and also to the expanded transmission protocol.

Figure 4:
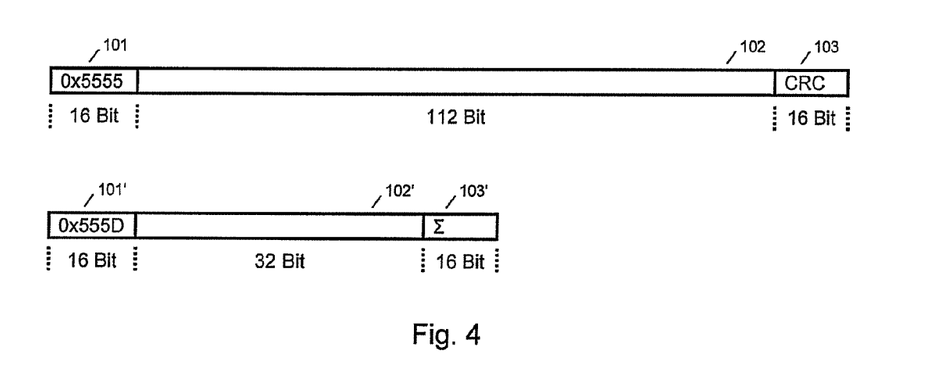
FIG. 4 shows a diagrammatic view of the data packets provided for data transmission in accordance with the first embodiment.

FIG. 4 shows a diagrammatic view of the data packets provided for data transmission in accordance with the first embodiment. Each data packet begins with a 16 bit long SYNC data word 101, 101' which permits the testing device 2 simple synchronization and re-adjustment to the clock of the device 1 to be tested (see above). With the expanded protocol variant the SYNC data word 101 is of the value "1010 1010 1010 1010"=0x5555, with the simplified protocol variant the SYNC data word 101' is of the value "1010 1010 1010 1011"=0xD555.

In the expanded transmission protocol, following the SYNC data word 101, is a 112 bit long useful data field 102, in the case of the simplified transmission protocol the useful data field 102' following the SYNC data word 101' is only 32 bits long. The last 16 bits of a data packet, in the case of the expanded transmission protocol, form a CRC testing value 103 ("cyclic redundancy check"), that is to say a value which is computed in a cyclic redundancy check which is here performed only in relation to the useful data. In the simplified transmission protocol, instead of the CRC test value 103, a simple arithmetic check sum 103' of the first and second halves of the useful data (16 bits in each case) is used.

The device 1 to be tested independently decides which protocol it uses and the testing device 2 must respond with the same protocol. The protocol may not be changed during an active connection. Both variants of the protocol, that is to say the expanded transmission protocol and the simplified transmission protocol, can be distinguished by the testing device 2 by the slightly different SYNC data words 101, 101'.

Scrambling

To reduce the probability of longer sequences of successive zeros or ones occurring in the useful data 102 or in the CRC test value 103 the useful data 102 and the CRC test value 103 can be scrambled in the expanded transmission protocol. The scrambling function is a simple byte-wise XOR gating with the value "0000 1111"=0xF0.

Bit Sequence

The so-called "Little Endian" format is used as the data format, in which the least significant byte comes first for a data word comprising more than one byte. Within a byte the least significant value bit comes first. A 2 byte (16 bit) long data word 0x1234 would thus be transmitted as a sequence of bits in the succession "0010 1100 0100 1000" (from left to right). Having regard to the scrambling in the expanded transmission protocol that would afford for the resulting bit sequence "0010 0011 0100 0111".

Cyclic Redundancy Check (CRC)

The polynomial used in the expanded transmission protocol for cyclic redundancy checking is $x^{16}+x^{15}+x^{12}+x^7+x^6+x^4+x^3+1$.

That polynomial is almost optimum for messages of up to 135 bits long, but it is not suitable for longer messages (see also: Koopman and Chakravarty, "Cyclic Redundancy Code (CRC) Polynominal Selection for Embedded Networks", Proceedings of International Conference on Dependable Systems and Networks, Florence, Italy, 2004). Therefore for future versions of the expanded transmission protocol it may be necessary to use other polynomials. Prior to computation of the CRC testing value 103 the CRC register should be preloaded with a value 0x5555.

Collision Identification

During an ongoing transmission the device which is just sending, that is to say either the device 1 to be tested or the testing device 2, should check the electric transmission line 3 for colliding LO-voltages and, if such a voltage is detected, the sending device should immediately terminate the transmission. A fresh transmission should not be begun within a predefined dead time which is preferably of a length of 160 bits. That behavior is obligatory for the testing device 2 and optional for the device 1 to be tested.

Data Flow Control

The current version of the transmission protocol does not involve active data flow control and does not have any kind of handshake method. For future expansions however the use of the 8 bit long data word 0xFF is reserved in the first byte of the useful data field 102, 102', that is to say data packets whose useful data 102, 102' begin with 0xFF may not be used in the current version of the transmission protocol.

In principle each of the two devices, that is to say both the device 1 to be tested and also the testing device 2, can send a data packet at any desired time. There are however a few limitations in regard to the dead time after which a transmission may be started.

If an LO-voltage has been identified on the electric transmission line 3, a fresh transmission should not be begun within a predefined dead time which is preferably 160 bits in length. As already mentioned that behavior is obligatory for the testing device 2 and optional for the device 1 to be tested.

When a SYNC data word 101, 101' has been received, the procedure should therefore begin with detecting the other data of the data packet, that is to say the useful data 102, 102' and the CRC testing value 103 or the check sum 103'. When the complete data packet has been received the CRC testing value 103 or the check sum 103' should be evaluated to detect possible transmission errors. In the event that a transmission error has been detected the corresponding data packet should simply be rejected. A corresponding response to the sending device is not provided. After reception of a complete data packet the receiving device can begin with its own transmission directly, that is to say without paying attention to further dead time conditions. After the sending device has terminated the transmission of a data packet it should wait a dead time of preferably 16 bits in length before it begins with a further transmission. If successful reception was not possible for a predetermined time (preferably 3000 ms), the testing device 2 should reset the connection by sending an RESET message and try to make a fresh connection. The device 1 to be tested should send at least one data packet within a predetermined time (preferably 1000 ms). That applies however only if at least one communication channel was registered in one of the higher OSI layers (see OSI layer 3/4 for the definition of a communication channel).

OSI Layer 3/4: Communication Layer/Transport Layer

Each of the two devices, that is to say both the device 1 to be tested and also the testing device 2, makes available a number of communication end points, that is to say information ports which are linked to a given functionality. Each device must know the functionality of the communication end points of the respective other device in order to be able to perform a meaningful communication therewith. In that respect the protocol is purely generic and only bears the responsibility for data exchange. Interpretation of the data in respect of its functionality must be implemented by the OSI layer 7 (application layer), which however is not part of the transmission method according to the invention. Typically that would take place based on the knowledge of the present device 1 to be tested; the testing device 2 can ask for that information by way of the communication end point 0x00 in the device 1 to be tested.

To connect two communication end points each of the two devices, that is to say both the device 1 to be tested and also the testing device 2, can open an associated communication channel. That is effected by a suitable data packet which relates to the corresponding communication channel or the associated communication end point being sent. In that way typically the communication channel would be registered in respect of the respective other device. It will be noted however that both devices can also simply ignore an incoming request, in this case for registration of a given communication channel. The initiator of the request would then usually repeat his request a number of times before giving up.

When a communication channel is opened between two communication end points, the desired data flow type must also be specified. That 8 bit long identifier defines the structure of the subsequent bits of the useful data field 102, 102', that is to say the remaining part of the useful data 102, 102', as well as the nature and way in which those data are to be processed, for example reading, writing, and so forth. Actual processing of the remaining part of the useful data is then effected by the OSI layers 5/6.

Figure 5:
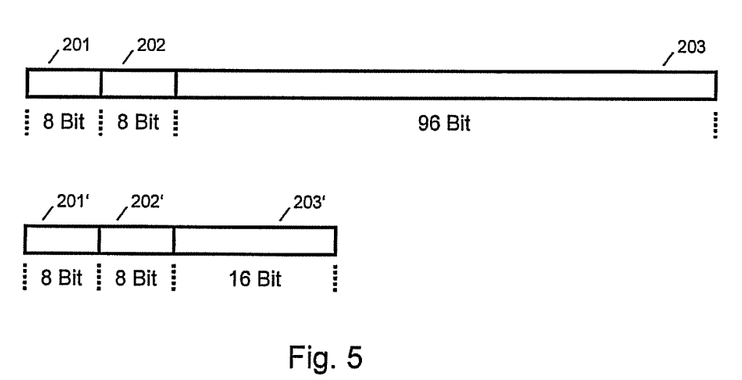
FIG. 5 shows a diagrammatic view of the general structure of the useful data in accordance with the first embodiment.

FIG. 5 shows a diagrammatic view of the general structure of the useful data 102, 102' in accordance with the first embodiment. With the expanded transmission protocol the useful data 102 begin with an 8 bit long identifier 201 for establishing the desired communication end point or the associated communication channel. That is followed by the 8 bit long identifier 202 for specifying the data flow type, followed then by the 96 bit long remaining part 203 of the useful data 102.

With the simplified variant of the transmission protocol the same thing applies in principle as in the case of the expanded protocol variant, that is to say the useful data region 102' begins with an 8 bit long identifier 201' for establishing the desired communication end point or the associated communication channel, followed by the 8 bit long identifier 202' for specifying the data flow type. The subsequent 16 bit long remaining part 203' of the useful data field 102' which is shorter in comparison with the expanded transmission protocol however allows only shorter structures.

In addition with the simplified transmission protocol the device 1 to be tested can also operate in connection-less fashion, that is to say the device 1 does not work on the basis of the concept of registered communication channels. In that case the device 1 to be tested outputs all possible available items of information of its communication end points without observing possible requests from the testing device 2.

In accordance with the expanded transmission protocol provided in the device 1 to be tested are the predefined communication end points which are shown in Table 3, or the associated communication channels, for reading and/or writing items of information.

TABLE 3

Predefined communication end points in the device 1 to be tested in accordance with the expanded transmission protocol

| Comm. end point | Data flow type | Information | Data structure |
|---|---|---|---|
| 0x00 | reading | device identification and firmware version | 16 bit firmware version + 8 byte character sequence for device identification |
| 0x01 | reading | hardware configuration | 16 bit hardware configuration + 8 byte character sequence "HWCONFIG" |
| 0x02 | reading/ writing | software configuration | 16 software configuration + 8 byte character sequence "SWCONFIG" |
| 0xFE | reading | protocol version | 8 bit version + 8 bit bit switch + 8 byte character sequence "ESOP" |
| 0xFF | — | data flow control in the OSI layer 2 | — |

The predefined communication end points provided in accordance with the simplified transmission protocol in the device 1 to be tested or the associated communication channels, for reading and/or writing items of information, are shown in Table 4.

TABLE 4

Predefined communication end points in the device 1 to be tested in accordance with the simplified transmission protocol

| Comm. end point | Data flow type | Information | Data structure |
|---|---|---|---|
| 0x00 | reading | device identification and firmware version | 12 bit device identification + 4 bit firmware version |
| 0x01 | reading | hardware configuration | 16 bit hardware configuration |
| 0x02 | reading/ writing | software configuration | 16 software configuration |
| 0xFE | reading | protocol version | 8 bit version + 8 bit bit switch |
| 0xFF | — | data flow control in the OSI layer 2 | — |

Both in the enlarged and also in the simplified variant of the transmission protocol the communication end points for reading the device identification and the firmware version (communication channel 0x00) and for reading the protocol version (communication channel 0xFE) should be implemented in each device 1 to be tested according to the invention. The communication end points for reading the hardware configuration (communication channel 0x01) and for reading or writing the software configuration (communication channel 0x02) are in contrast optional and do not need to be implemented by each device 1 to be tested according to the invention. The communication end point for data flow control in the OSI layer 2 (communication end point 0xFF) is reserved for future expansions of the transmission protocol.

OSI Layer 5/6: Session Layer/Presentation Layer

In dependence on the data flow type the remaining part 203, 203' of the useful data 102, 102' is interpreted and processed. In that respect the data flow type specifies the structure of the data, the nature and way in which the data are to be processed and the direction of the flow of information.

Each of the two devices, that is to say both the device 1 to be tested and also the testing device 2 can either process data packets with a given data flow type or ignore them or answer with a data packet with another data flow type.

Figure 6:
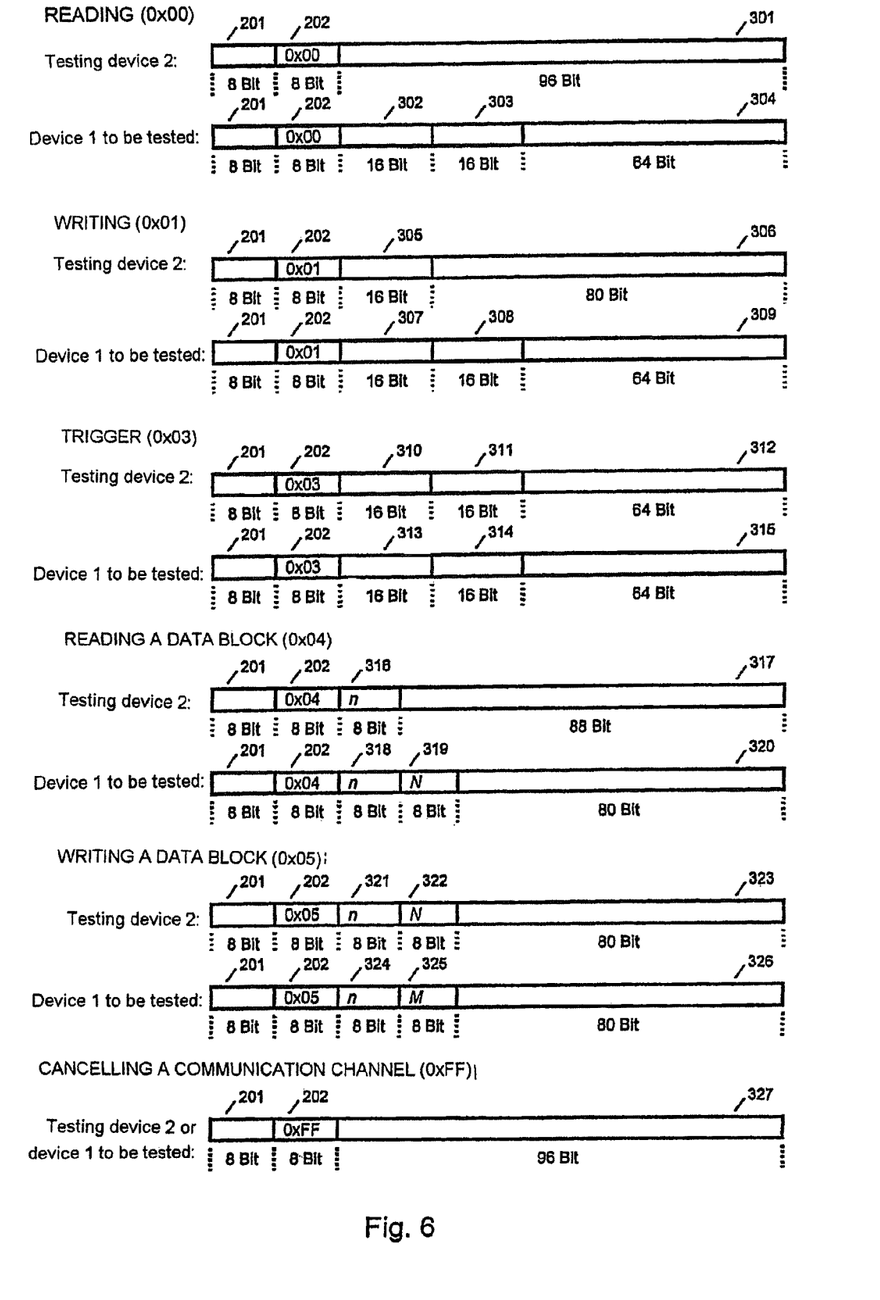
FIG. 6 shows a diagrammatic view of the structure of the useful data for the expanded transmission protocol for the provided data flow types.

FIG. 6 shows the structure of the useful data 102 for the expanded transmission protocol for the data flow types provided in the current version of the transmission method in accordance with the invention. They are described in greater detail hereinafter.

1. Reading (0x00)

The data flow type READING (0x00) serves the testing device 2 for reading items of information from the device 1 to be tested, that is to say the direction of the flow of informations from the device 1 to be tested to the testing device 2.

To register a communication channel for reading items of information from the device 1 to be tested the testing device 2 sends a data packet to the device 1 to be tested. Within the useful data 102 of that data packet the 8 bit long identifier 201 specifies the communication end point selected by the testing device 2, for example the communication end point for reading the device identification and the firmware version (communication channel 0x00). The value 0x00 of the subsequent 8 bit long identifier 202 specifies the data flow type READING. The subsequent remaining part 301 of the useful data 102, that is to say the remaining 96 bits of the useful data field 102, is irrelevant for the communication, it is ignored by the device 1 to be tested.

The device 1 to be tested can process the data packet sent by the testing device 2 and send the items of information linked to the communication end point in a corresponding data packet to the testing device 2. Within the useful data 102 of that data packet the 8 bit long identifier 201 specifies the communication end point selected by the testing device 2 and the subsequent 8 bit long identifier 202 specifies the data flow type READING (0x00) predetermined by the testing device 2. The items of information to be read, for example the device identification and the firmware version, are transmitted by the device 1 to be tested in the remaining part 203 of the useful data 102 in a structure comprising a 16 bit long value field 302, a 16 bit long reserved field 303 and a 64 bit long character sequence field 304, to the testing device 2. The character sequence in the 64 bit long character sequence field 304 in that case typically contains a mnemonic of the significance or function of the value in the 16 bit long value field 302.

2. Writing (0x01)

The data flow type WRITING (0x01) serves the testing device 2 for overwriting items of information in the device 1 to be tested, that is to say the direction of the flow of information is from the testing device 2 to the device 1 to be tested.

To register a communication channel for overwriting of items of information in the device 1 to be tested the testing device 2 sends a data packet to the device 1 to be tested. Within the useful data 102 of that data packet the 8 bit long identifier 201 specifies the communication end point selected by the testing device 2, for example the communication end point for writing the software configuration (communication channel 0x02). The value 0x01 of the subsequent 8 bit long identifier 202 specifies the data flow type WRITING. The items of information to be written, for example the software configuration, are transmitted by the testing device 2 in the remaining part 203 of the useful data 102 in a 16 bit long value field 305, to the device 1 to be tested. The subsequent remaining part 306 of the useful data 102, that is to say the remaining 80 bits of the useful data field 102, is irrelevant for the communication, it is ignored by the device 1 to be tested.

The device 1 to be tested can process the data packet sent by the testing device 2 and send "as an echo" a corresponding data packet to the testing device 2. Within the useful data 102 of that data packet the 8 bit long identifier 201 specifies the communication end point selected by the testing device 2 and the subsequent 8 bit long identifier 202 specifies the data flow type WRITING (0x01) predetermined by the testing device 2. A copy of the written items of information, for example the software configuration, is transmitted by the device 1 to be tested in the remaining part 203 of the useful structure 102 in a structure comprising a 16 bit long value field 307, a 16 bit long reserved field 308 and a 64 bit long character sequence field 309, to the testing device 2. The character sequence in the 64 bit long character sequence field 303 in that way typically contains a mnemonic of the significance or function of the value in the 16 bit long value field 307.

3. Reserved (0x02)

The data flow type RESERVED (0x02) is reserved for a later supplementing of the transmission method in accordance with the invention by an inverse trigger. The direction of the flow of information is from the device 1 to be tested to the testing device 2.

4. Trigger (0x03)

The data flow type TRIGGER (0x03) serves the testing device 2 for one-off feed of a value into the device 1 to be tested, that is to say the direction of the flow of information is from the testing device 2 to the device 1 to be tested.

To register a communication channel for the one-off feed of a value into the device 1 to be tested the testing device 2 sends a data packet to the device 1 to be tested. Within the useful data 102 of that data packet the 8 bit long identifier 201 specifies the communication end point selected by the testing device 2. The value 0x03 of the subsequent 8 bit long identifier 202 specifies the data flow type TRIGGER. The value to be fed in is transmitted by the testing device 2 in the remaining part 203 of the useful data 102 in a 16 bit long value field 310 followed by a 16 bit long trigger identifier 311. The subsequent remaining part 312 of the useful data 102, that is to say the remaining 64 bits of the useful data field 102, is irrelevant for the communication, it is ignored by the device 1 to be tested.

The trigger identifier 311 should be of a unique value for a given trigger event and should be altered for a subsequent trigger event, in which respect only even numbers should be used. The testing device 2 can repeat a data packet with a given trigger identifier 311; as long as the trigger identifier 311 remains the same the device 1 to be tested ignores the repetition. The testing device 2 can re-use a trigger identifier 311 of a given value after the device 1 to be tested has responded with a different value or a different data flow type.

The device 1 to be tested can process the data packet sent by the testing device 2 and send a trigger event in a corresponding data packet to the testing device 2. Within the useful data 102 of those data packets the 8 bit long identifier 201 specifies the communication end point selected by the testing device 2 and the subsequent 8 bit long identifier 202 specifies the data flow type TRIGGER (0x03) predetermined by the testing device 2. In dependence on whether the trigger is or is not already concluded the device 1 to be tested either transmits a copy of the value to be fed in ("echo") or a current read-out value in a structure comprising a 16 bit long value field 313, a 16 bit long trigger identifier/bit switch 314 and a 64 bit long character sequence field 315, to the testing device.

The state of the trigger (concluded or not) is indicated by the least significant bit of the trigger identifier/bit switch 314 which also includes a copy of the 16 bit long trigger identifier 311 predetermined by the testing device 2. The character sequence in the 64 bit long character sequence field 315 in that case typically contains a mnemonic of the significance or function of the value in the 16 bit long value field 303.

5. Reading a Data Block (0x04)

The data flow type READING A DATA BLOCK (0x04) serves the testing device 2 for reading items of information from the device 1 to be tested, which are longer than the available useful data field of a data packet. That is effected by the transmission of a number N of each 10 byte long data blocks, that is to say the total length of the data transmitted from the device 1 to be tested to the testing device 2 is a multiple of 10 bytes. The direction of the flow of information is from the device 1 to be tested to the testing device 2.

For registering a communication channel for reading longer items of information from the device 1 to be tested the testing device 2 sends a data packet to the device 1 to be tested. Within the useful data 102 of that data packet the 8 bit long identifier 201 specifies the communication end point selected by the testing device 2. The value 0x04 of the subsequent 8 bit long identifier 202 specifies the data flow type READING A DATA BLOCK. The testing device 2 specifies the data block to be read by an index n which is transmitted in the remaining part 203 of the useful data 102 in an 8 bit long index field 316. The subsequent remaining part 317 of the useful data 102, that is to say the remaining 88 bits of the useful data field 102, is irrelevant for the communication, it is ignored by the device 1 to be tested.

The testing device 2 can set the index n to ZERO (0x00) to request the total number N of data blocks from the device 1 to be tested, or it can set the index n to a value of greater than zero to request a transmission beginning at a given data block. (The first data block has the index n=1.) The device 1 to be tested can ignore such a request.

The device 1 to be tested can process the data packet sent by the testing device 2 and send the data blocks to be read, in corresponding data packets, to the testing device 2. Within the useful data 102 of those data packets the 8 bit long identifier 201 specifies the communication end point selected by the testing device 2 and the subsequent 8 bit long identifier 202 specifies the data flow type READING A DATA BLOCK (0x04) predetermined by the testing device 2. The data blocks to be read are transmitted from the device 1 to be tested in the respectively remaining part 203 of the useful data 102 in a structure comprising an 8 bit long index field 318 (index n of the data block), an 8 bit long number field 319 (total number N of the data blocks) and an 80 bit long character sequence field 320 (data block), to the testing device 2.

The device 1 to be tested can set the index n to ZERO (0x00) to signal to the testing device 2 that the communication end point selected thereby is admittedly supported, but it does not contain any meaningful items of information.

6. Writing a Data Block (0x05)

The data flow type WRITING A DATA BLOCK (0x05) serves the testing device 2 for overwriting items of information in the device 1 to be tested, which are longer than the available useful data field of a data packet. That is done by the transmission of a number N each of 10 bytes long data blocks, that is to say the total length of the data transmitted by the testing device 2 to the device 1 to be tested is a multiple of 10 bytes. The direction of the flow of information is from the testing device 2 to the device 1 to be tested.

For registering a communication channel for overwriting longer items of information in the device 1 to be tested the testing device 2 sends a data packet to the device 1 to be tested. Within the useful data 102 of that data packet (and the further data packets) the 8 bit long identifier 201 specifies the communication end point selected by the testing device 2. The value 0x05 of the subsequent 8 bit long identifier 202 specifies the data flow type WRITING A DATA BLOCK. The data blocks to be written are transmitted by the testing device 2 in the respectively remaining part 203 of useful data 102 in a structure comprising an 8 bit long index field 321 (index n of the data block), an 8 bit long number field 322 (total number N of the data blocks) and an 80 bit long character sequence field 323 (data block) to the device 1 to be tested.

The testing device 2 can set the total number N to ZERO (0x00) when there are no data for transmission. Data packets in which the index n is equal to ZERO (0x00) should be ignored by the device 1 to be tested.

The device 1 to be tested can process the data packets sent by the testing device 2 and after reception of the first data packet should send a corresponding data packet for confirmation to the testing device 2. Within the useful data 102 of that data packet the 8 bit long identifier 201 specifies the communication end point selected by the testing device 2 and the subsequent 8 bit long identifier 202 specifies the data flow type WRITING A DATA BLOCK (0x05) predetermined by the testing device 2. In the remaining part 203 of the useful data 102, a structure is defined comprising an 8 bit long index field 324 (index n of a data block) and an 8 bit long storage space field 325 (storage space in the device 1 to be tested measured in a number N of 10 byte data blocks). The subsequent remaining part 327 of the useful data 102, that is to say the remaining 80 bits of the useful data field 102, is irrelevant for the communication, it is ignored by the testing device 2.

The device 1 to be tested can send corresponding data packets during the writing operation at any time itself in order for example to request a given data block (1≤n≤N) or to communicate to the testing device 2 its available storage space (M>0). After successful transmission of all data blocks the device 1 to be tested should inform the testing device 2 about that by sending a data packet with n>N.

7. Canceling a Communication Channel (0xFF)

The data flow type CANCELING A COMMUNICATION CHANNEL (0xFF) serves for both devices, that is to say both the device 1 to be tested and also the testing device 2, for erasing or rejecting a given communication end point or the associated communication channel.

To erase or reject a given communication end point or the associated communication channel a device sends a data packet to the other device. Within the useful data 102 of that data packet the 8 bit long identifier 201 specifies the communication end point to be erased. The value 0xFF of the subsequent 8 bit long identifier 202 specifies the data flow type CANCELING A COMMUNICATION CHANNEL. The subsequent remaining part 327 of the useful data 102, that is to say the remaining 96 bits of the useful data field 102, is irrelevant for the communication, it is ignored by the other device.

The data flow types READ (0x00), WRITE (0x01) and TRIGGER (0x03) are also supported by the simplified transmission protocol. That however allows only shorter data structures by virtue of the useful data field 102' being shorter in comparison with the expanded transmission protocol.

The device to be tested can be for example a wired or wireless microphone.

The invention claimed is:

1. A system for the bidirectional synchronous transmission of data between a device to be tested and a testing device comprising:
a device to be tested and a testing device which are connected together by an electric transmission line and by an electric ground line,
wherein the device to be tested and the testing device are suitable for sending and receiving data synchronously with a predetermined clock frequency and phase as sequences of first and second voltages which respectively represent a first and second value of a bit on the electric transmission line,
wherein to receive the data the testing device samples a voltage on the electric transmission line at predetermined sampling phases of the clock to identify whether the first or the second voltage is present,
wherein to send the data the device to be tested produces the sequences of first and second voltages in such a way that the first or the second voltage is present on the electric transmission line in a phase range of at least −20° through +20° of the predetermined sampling phases of the receiving device,
wherein the clock frequency and phase is predetermined by the device to be tested and the testing device is synchronized to said predetermined clock frequency and phase, and
wherein in an initialization phase the device to be tested transmits a sequence of alternate first and second voltages on the electric transmission line and the testing device derives the clock frequency and phase from said sequence.

2. A system as set forth in claim 1 wherein the predetermined sampling phases of the device to be tested and the testing device are in mutually phase-displaced relationship.

3. A system as set forth in claim 2 wherein the sampling phases of the device are substantially central between the sampling phases of the testing device.

4. A system as set forth in claim 1 wherein in a data transmission phase data are transmitted in data packets which begin with a shorter sequence of alternate first and second voltages, and wherein the testing device subsequently corrects the derived clock frequency and phase with said sequence.

5. A method of bidirectional synchronous transmission of data between a device to be tested and a testing device which are connected together by an electric transmission line and by an electric ground line, comprising the following steps:
sending and receiving data synchronously with a predetermined clock frequency and phase as sequences of first and second voltages which respectively represent a first and a second value of a bit on the electric transmission line;
sampling a voltage on the electric transmission line at predetermined sampling phases of the clock to identify whether the first or the second voltage is present for receiving the data;
producing the sequences of first and second voltages so that in a phase range of at least −20° through +20° of the predetermined sampling phases of a receiving device the first or the second voltage is present on the electric transmission line for sending the data;
predetermining the clock frequency and phase by the device to be tested and synchronization to the predetermined clock frequency and phase by the testing device,
wherein in an initialization phase the device to be tested transmits a sequence of alternate first and second voltages on the electric transmission line and the testing device derives the clock frequency and phase from said sequence.

* * * * *

UNITED STATES PATENT AND TRADEMARK OFFICE
CERTIFICATE OF CORRECTION

| | |
|---|---|
| PATENT NO. | : 8,594,166 B2 |
| APPLICATION NO. | : 13/001374 |
| DATED | : November 26, 2013 |
| INVENTOR(S) | : Dirk Reymann |

Page 1 of 2

It is certified that error appears in the above-identified patent and that said Letters Patent is hereby corrected as shown below:

On the Title Page:

In the Abstract:

In the second column at Item (57), line 10, after "data", please insert a --,--.

In the second column at Item (57), line 14, after "data", please insert a --,--.

In the second column at Item (57), line 18, please delete "is predetermined" and insert --are predetermined--.

In the second column at Item (57), line 19, after "tested", please insert a --,--.

In the second column at Item (57), line 21, after "phase", please insert a --,--.

In the Claims:

Column 18, line 6, claim 1: after "data", please insert a --,--.

Column 18, line 10, claim 1: after "data", please insert a --,--.

Column 18, line 16, claim 1: please delete "is predetermined" and insert --are predetermined--.

Column 18, line 21, claim 1: after "phase", please insert a --,--.

Column 18, line 33, claim 4: after "wherein", please insert a --,--.

Column 18, line 34, claim 4: after "phase", please insert a --,--.

Column 18, line 53, claim 5: after "that", please insert a --,--.

Column 18, line 55, claim 5: after "device", please insert a --,--.

Signed and Sealed this
First Day of April, 2014

Michelle K. Lee
*Deputy Director of the United States Patent and Trademark Office*

Column 18, line 57, claim 5: after "data;", please insert --and--.

Column 18, line 61, claim 5: after "phase", please insert a --,--.